(12) United States Patent
Walker, Jr.

(10) Patent No.: US 6,986,105 B2
(45) Date of Patent: Jan. 10, 2006

(54) METHODS EMPLOYING MULTIPLE CLIPBOARDS FOR STORING AND PASTING TEXTBOOK COMPONENTS

(75) Inventor: Kenneth A. Walker, Jr., Somerville, MA (US)

(73) Assignee: Vista Print Limited, (BM)

( * ) Notice: Subject to any disclaimer, the term of this patent is extended or adjusted under 35 U.S.C. 154(b) by 355 days.

(21) Appl. No.: 10/354,808

(22) Filed: Jan. 30, 2003

(65) Prior Publication Data

US 2004/0153974 A1    Aug. 5, 2004

(51) Int. Cl.
*G06F 7/00*    (2006.01)

(52) U.S. Cl. .................. 715/531; 715/513; 715/530
(58) Field of Classification Search ........ 715/530–531, 715/501.1, 513
See application file for complete search history.

(56) References Cited

U.S. PATENT DOCUMENTS

| | | | | |
|---|---|---|---|---|
| 5,301,268 A | * | 4/1994 | Takeda ..................... | 719/329 |
| 5,404,442 A | * | 4/1995 | Foster et al. ................ | 715/769 |
| 5,752,254 A | | 5/1998 | Sakairi | |
| 5,850,214 A | * | 12/1998 | McNally et al. ............ | 345/173 |
| 5,964,834 A | * | 10/1999 | Crutcher .................... | 709/213 |
| 6,269,389 B1 | * | 7/2001 | Ashe ......................... | 718/100 |
| 6,950,980 B1 | * | 9/2005 | Malcolm .................... | 715/505 |
| 2002/0174241 A1 | * | 11/2002 | Beged-Dov et al. ........ | 709/230 |

OTHER PUBLICATIONS

Miller et al, "Synchronizing Clipboards of Multiple Computers", UIST'99 , ACM, 1999.*
"Using the Clipboards", http://www.el34.com/eddie/docs/clipboard.html, Jun. 2000.*
Hughes, L., [wplug] multiple clipboard buffers & log (formerly of "Re: win4lin?"), http:/www.wplug.org/pirpermail'/wplug/2000-december/011707.html, Dec. 26, 2000.*
Apperley et al, "Breaking the Copy/Paste Cycle: The Stretchable Selection Tool", ACM, 2000.*
Neuburg, M., TidBits: Multiple Clipboards on Mac OS X, #667, Feb. 17, 2003.*
ANONYMOUS; "Clipboard interaction extensions"; Research Disclosure, Kenneth Mason Publications, Hampshire, GB, vol. 334. No. 35, Feb. 1992; 1 page.
ANONYMOUS; "Moving and Copying Text Tutorial"; findtutorials.com; Aug. 17, 2001; pp. 1-4; http://tutorials.findtutorials.com/read/category/102/id/342/p/3.
"Clipboard Format for ASCII Text with Attributes"; IBM Technical Disclosure Bulletin, vol. 33, No. 11, Apr. 1, 1991; pp. 240-241.

* cited by examiner

*Primary Examiner*—Cesar Paula
(74) *Attorney, Agent, or Firm*—Robert Dulaney

(57) ABSTRACT

A method using two local clipboards in conjunction with the system clipboard to perform cut-and-paste and copy-and-paste operations during the creation and editing of markup language documents. A user editing a document has the option of cutting or copying an entire textbox or selected text from within a textbox. If an entire textbox is copied, two local clipboards are used in combination with the system clipboard to store related information in multiple locations. Upon receipt of a paste command from the user, if a text insertion cursor is present, the text to be pasted is inserted into an existing textbox. If no text insertion cursor is present, a new textbox is created and the text is inserted in the new textbox. The attributes of the text in a newly created textbox depend on how and from what source the text was cut or copied.

15 Claims, 5 Drawing Sheets

METHODS EMPLOYING MULTIPLE CLIPBOARDS FOR STORING AND PASTING TEXTBOOK COMPONENTS

BACKGROUND OF THE INVENTION

1. Field of the Invention

The present invention relates generally to the creation and editing of electronic documents and, more particularly, to the creation and editing of markup language documents.

2. Description of the Related Art

Modern Web browsers, such as Internet Explorer from Microsoft Corporation and Netscape Navigator from Netscape Communications Corporation, provide support for the versatile and powerful markup languages and standards in use today, such as XHTML (eXtensible Hypertext Markup Language), Cascading Style Sheets, Document Object Module and scripting. These technologies allow software applications to be downloaded over the Web to a user's computer and run in the user's browser. To facilitate and promote the development of browser-compatible software applications, browser vendors typically implement and make readily available an Application Program Interface of standard routines, protocols and tools for use by application developers.

Many enterprises have recognized the commercial opportunities presented by browser-based applications. Among the new businesses that have taken advantage of the capabilities of the Web are printing service providers. Typically, these companies provide their customers with the ability to access the printing service provider's web site, download product templates and a product design program, and create a customized product in the user's browser.

One network-based product design system is disclosed in U.S. Pat. No. 6,247,011 entitled "Computerized Prepress". The patent discloses a document-authoring tool that is downloaded from a server and runs in the client browser. A markup language version of the product created by the client is uploaded to the server where it is processed by a translation program into a prepress file format.

Another system is disclosed in co-pending and co-owned U.S. application Ser. No. 09/557,571 entitled "Managing Print Lobs", which is hereby incorporated by reference. The system discloses a downloadable editing tool that allows a customer to create and edit markup language documents in the customer's browser. The system makes a number of pre-designed product templates available for customer viewing, downloading, and customizing.

As is well known, the "copy-and-paste" and "cut-and-paste" functions provided by modern operating systems are useful in many circumstances for allowing a user to easily move or reproduce selected sections of text. When a copy or cut operation is performed by the user, the operating system stores the copied or cut information in a region of system memory commonly referred to as the system clipboard. The system clipboard is available to any application program running on the computer, allowing the user to transfer data either within a single application or between different applications.

However, the system clipboard does not provide adequate support for markup language documents. The clipboard function provided by current operating systems does not provide the necessary functionality to easily and efficiently move text within a markup language document or to insert text into a markup language document from another application. This deficiency in clipboard functionality has impaired and limited the usefulness of browser-based document creation programs, especially for users interested in creating and editing a document with more than a small amount of text. Therefore, a need exists for a system and method supporting the transferring of data into and within markup language documents being editing in a user's browser program.

SUMMARY

The present invention is directed to satisfying the need for improved text cutting, copying and pasting capabilities for use with creating and editing markup language documents. In accordance with one aspect of the invention, a user editing a document has the option of cutting or copying an entire textbox or selected text from within a textbox. If an entire textbox is copied, two local clipboards are used in combination with the system clipboard to store related information in multiple locations. In accordance with another aspect of the invention, upon receipt of a paste command from the user, if a text insertion cursor is present the text to be pasted is inserted into an existing textbox. If no text insertion cursor is present, a new textbox is created and the text is inserted in the new textbox. The attributes of the text in a newly created textbox depend on how and from what source the text was cut or copied.

These and other features and advantages of the present invention will become better understood with reference to the accompanying drawings, description and claims.

DETAILED DESCRIPTION OF PREFERRED EMBODIMENT

Figure 1:
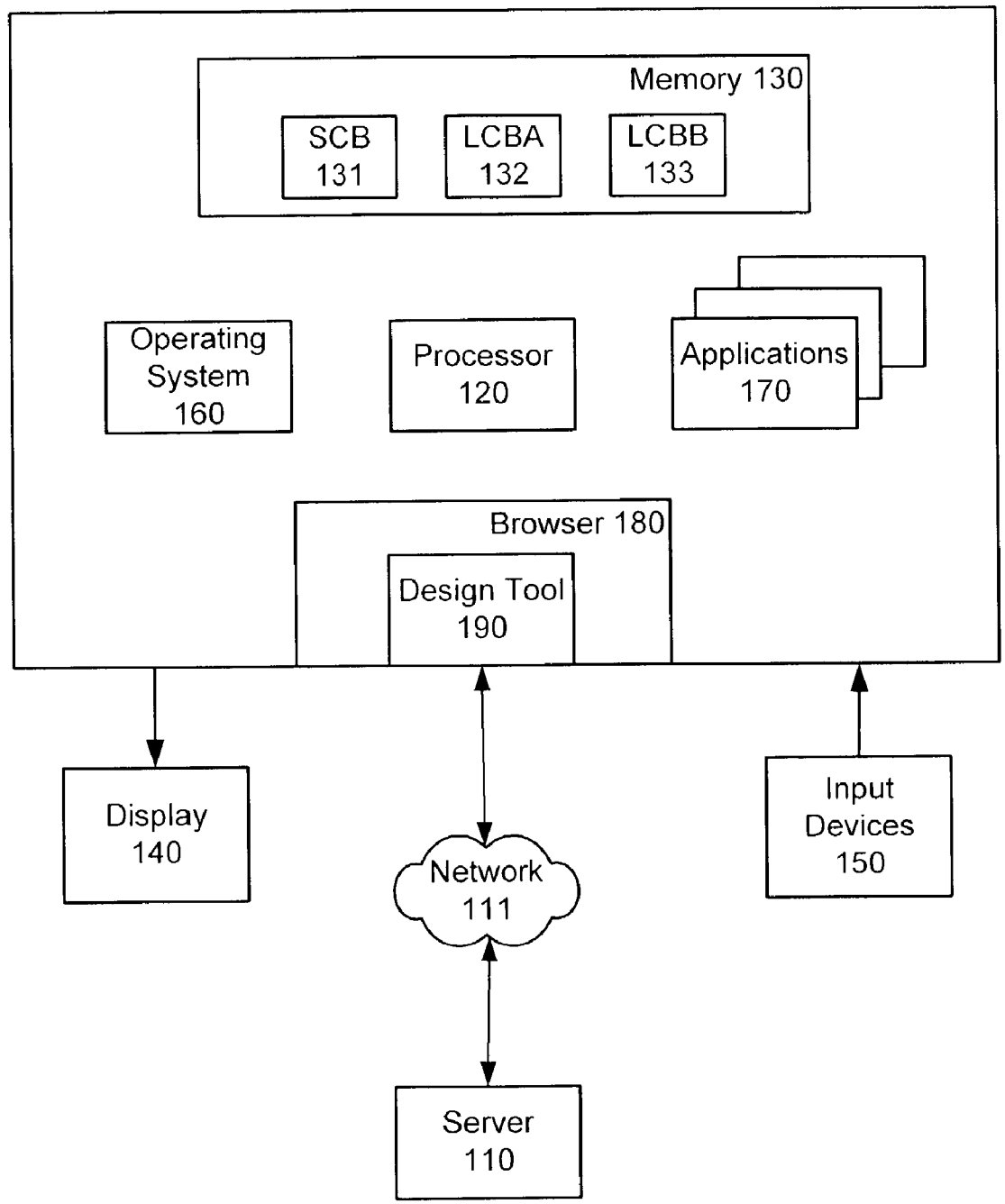
FIG. 1 is a block diagram of a computer system that is suitable for practicing the invention.

Referring to FIG. 1, an exemplary user computer system UCS 100 includes processor 120 and memory 130. Memory 130 is represented in FIG. 1 as a single block, but it will be understood that Memory 130 is intended to include all UCS 100 components and subsystems that provide data storage, such as RAM, ROM, and hard drives. In addition to providing permanent storage for all programs installed on UCS 100, such as the operating system and various application programs, Memory 130 also provides temporary storage required by the operating system and the applications while they are executing. In a preferred embodiment, UCS 100 is a typically equipped personal computer, but UCS 100 could be also be a portable computer, a tablet computer or other device that is capable of running browser software. The user views images from UCS 100 on Display 140, such as a CRT or LCD screen, and provides inputs to UCS 100 via Input Devices 150, such as a keyboard and a mouse.

When UCS 100 is operating, an instance of the USC 100 operating system will be running, represented in FIG. 1 by Operating System 160. In addition, the user may be running one or more application programs. One particular application program relevant to the invention is Web Browser 180, such as Microsoft Internet Explorer. Other applications running in USC 100, such as word processing, spreadsheet, e-mail, and presentation programs, are represented as Applications 170.

Design Tool 190 is a document creation program running in Browser 180 and allowing the user to edit markup language documents. In a preferred embodiment, Design Tool 190 is downloaded to System 100 via Network 111 from remote Server 110. Alternatively, Design Tool 190 could have been obtained by the user from Memory 130 or from another source.

Operating System 160 supports and controls the operation of system clipboard SCB 131. SCB 131 represents information copied or cut from a UCS 100 application and stored in Memory 130 awaiting the user's command to paste that information into the same or a different application. Local clipboards LCBA 132 and LCBB 133 represent two additional temporary clipboard areas in Memory 130. As will be discussed below, LCBA 132 and LCBB 133 are established and controlled by Design Tool 190 in connection with the invention.

Figure 2:
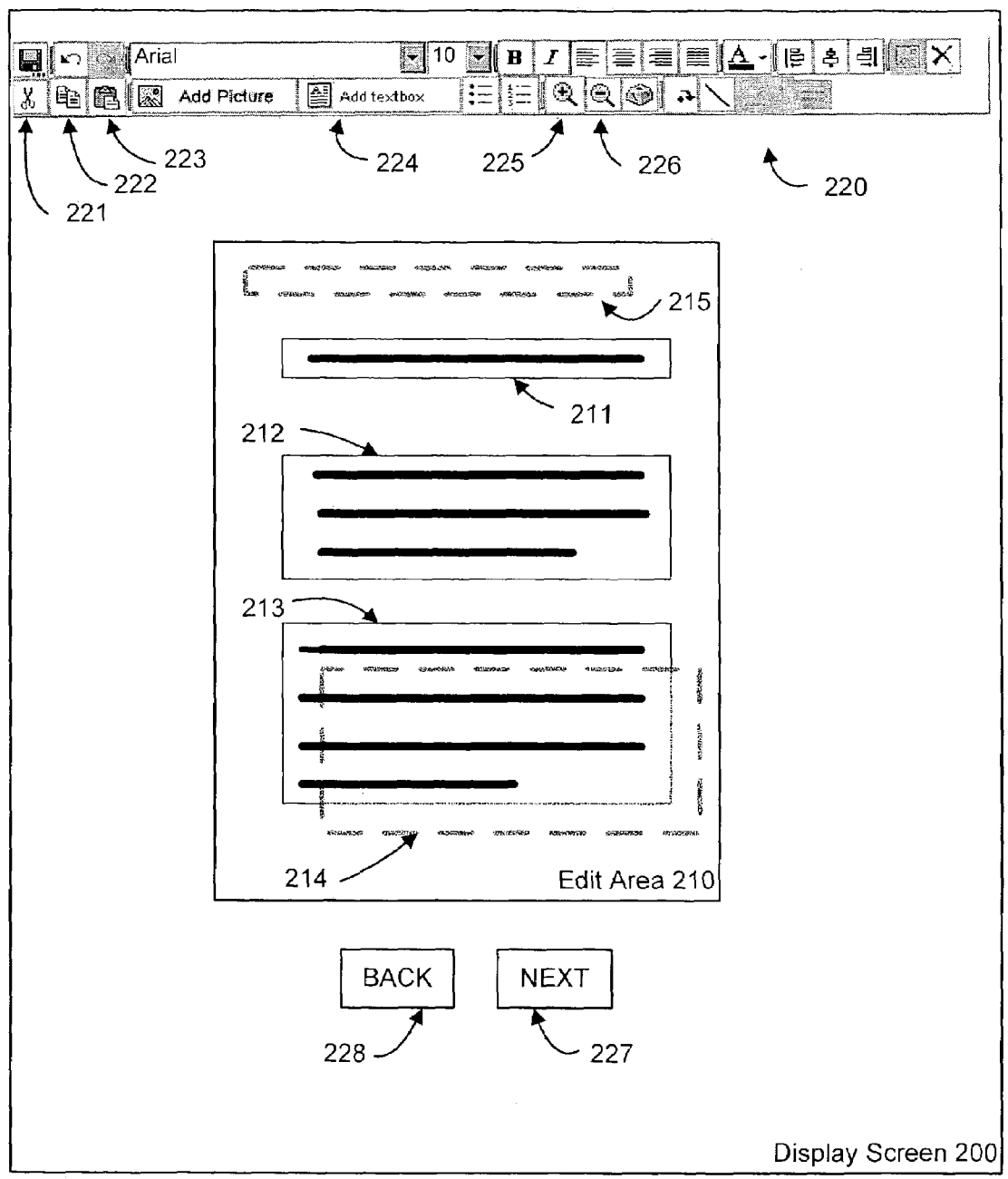
FIG. 2 is a representation of a document-editing screen displayed to the user.

Referring to FIG. 2, Display Screen 200 represents a display being viewed by the user of UCS 100 during the creation or editing of an electronic document using Design Tool 190. The displayed information includes Edit Area 210, Tool Bar 220, Next Button 227 and Back Button 228. It will be understood that Display Screen 200 could also be displaying various additional instructions, navigation buttons, and other information (not shown) to the user.

Editing functions for the product being edited in Edit Area 210 are controlled by the user using Tool Bar 220. Tool Bar 220 contains control buttons and fields that can be used by the user during the design of a product to control font type, font size, alignment, colors, image insertion, and other functions not directly related to tile description of the preferred embodiment of the invention. Techniques for the design and operation of editing tool bars are well known in the art.

Edit Area 210 is the portion of Display Screen 200 in which the product being edited is displayed to the user. As used herein, references to editing of the product should be interpreted broadly to encompass all acts related to creating or modifying a product by insertions, deletions, relocations, duplications, modifications, or in any other way altering the content or the appearance of the product. For simplicity and ease of description of the invention, Edit Area 210 is depicted in FIG. 2 as containing a simple document page having one column and containing only text. It will be understood that the invention is not so limited and products prepared utilizing the invention could readily contain graphics, images, spreadsheets or other elements. Further, the product being prepared could have variable dimensions, proportions and orientation. For example, a document could be in landscape orientation and could have its contents organized into three columns to enable the user to create a two-fold brochure. While the invention has clear applicability to the design of products traditionally associated with text content, such as postcards, brochures, newsletters, catalogs and the like, it could be applied to any situation involving the copying or movement of text in a markup language description. For example, the product being designed in Edit Area 210 could be an item of clothing, promotional goods or any other product intended to have text later printed or otherwise applied to it.

In a preferred embodiment, one side or page of the product being editing is displayed and edited in Edit Area 210 at any one time. For example, if the user were designing a postcard, the user would be viewing and editing either the front side or the backside. When the user is ready to move to another side or page of the product, the user can use Next Button 227 or Back Button 228, as appropriate, to change the display to the opposite side, or to move to another page in a multi-page document. Zoom In Button 225 and Zoom Out Button 226 allow the user to move in closer to focus on a portion of the page or to move out to view the entire page. In some situations, such as during the design of a large page or if the user has chosen to zoom in, less than the entire page may be visible to the user in Edit Area 210.

The term "text" is used broadly herein and is intended to include all of the letters, numbers, punctuation marks, graphic elements, symbols and other characters as are supported by the font or fonts being used to create the document. Text in markup language documents is typically entered, displayed and arranged in a text container commonly called a textbox. For representation purposes, the document in Edit Area 210 in FIG. 2 is depicted as containing three textboxes 211–213. It will be understood that the outlines of textboxes 211–213 shown in FIG. 2 are for explanation and visualization purposes in connection with this discussion only. In practice, a textbox will not have a visible outline unless, as discussed below, the textbox has been selected for editing by the user. Text previously entered by the user is represented in FIG. 2 by the horizontal solid lines inside textboxes 211–213.

The number, size and location of the textboxes in the user's document are preferably under the control of the user. To assist the user in creating the user's document, Design Tool 190 may provide the user with a selection of pre-designed document templates depicting various possibilities for document layout. Add Textbox Button 224 allows the user to add as many new empty textboxes as the user desires. When the user clicks on Add Textbox Button 224, Design Tool 190 will create and display a new textbox in a default location. In a preferred embodiment, the default location is the upper left corner of the page currently being displayed in Document Design Area 210, indicated in FIG. 2 by dotted line textbox 215. Other default locations could be employed.

Each textbox in the document will be in one of three possible states: unselected, selected, or edit. No more than one textbox in the document may be in the selected or edit state at any one time. In a preferred embodiment, the user places a textbox in the selected state by moving the mouse cursor anywhere inside the textbox and executing a single mouse click. When the user selects a textbox with the single mouse click, the textbox that had been previously in the select state, if any, is deselected and returns to the unselected state. All textboxes can be in the unselected state at the same time.

Figure 3A:
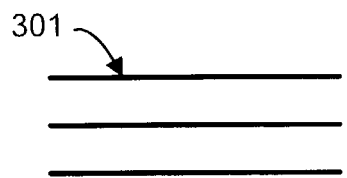
FIGS. 3A–3C are representations of three states of a textbox.
Figure 3B:
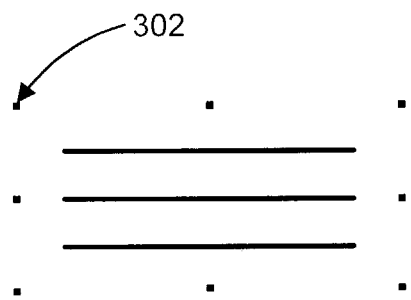
Figure 3C:
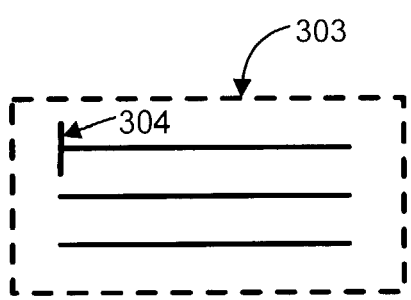

Referring to FIGS. 3A–3C, examples of the three states of a textbox are represented. In this example, the user has entered three lines of text 301 in the textbox, represented by three solid horizontal lines. As depicted in FIG. 3A, if a textbox is unselected, the user will see only the text, if any, contained in the textbox. One or more textboxes without any entered text can be present in the document though they would not be visible to the user unless they are in the selected or edit state. In a preferred embodiment, when a textbox is in the selected state, as shown in FIG. 3B, the boundaries of the textbox are indicated to the user by a set of eights dots or points 302. One dot 302 is located at each corner of the textbox and one at the midpoint of each side. Each of these dots also functions as a handle that can be used by the user to resize the textbox using a standard click-anddrag technique. The user can reposition the textbox by clicking inside the textbox and dragging it to the desired location.

If the user clicks inside a textbox that is in the selected state, the textbox will enter the edit state. As shown in FIG. 3C, in a preferred embodiment, this condition is indicated to the user by the appearance of a visible border surrounding the textbox, indicated by dashed line 303, and by the appearance of inline text insertion cursor 304 within the textbox. Text insertion cursor 304 is shown at the beginning of the text 301, however, in a preferred embodiment, the exact location at which insertion cursor 304 will appear in the edit state textbox depends on the position of the mouse cursor in the textbox at the time the click is performed. If the mouse cursor is positioned directly over an existing text string, insertion cursor 304 will appear in the text string at the mouse cursor location. If the mouse cursor is not positioned directly over the existing text, the text insertion cursor will appear either at the beginning of the text string or at the end, depending on the relative location of the mouse cursor in the textbox at the time the user performs the click operation.

Figure 3D:
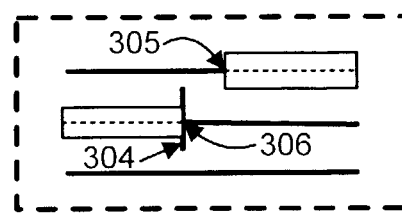
FIG. 3D is a representation of an inline text selection in a textbox.

FIG. 3D depicts an example of an inline text selection within the textbox. In this example, the user has placed text insertion cursor 304 at position 305 in the text string and, using a typical click-and-drag procedure, moved the cursor from position 305 to position 306 in the text string, thereby selecting the text between points 305 and 306. As is common in many applications, the text that has been selected is highlighted on the display screen by modifying the selected text and its associated background to display the selected text as light characters on a dark background to provide a visual text selection indication to the user.

The copy and cut operations will now be discussed. As is well understood, in a copy operation the source information is left in place in its original location while in a cut operation the source information is deleted from its original location. Both the copy and the cut operations can be considered to be text storing operations since both involve the same process of storing information from a textbox to at least SCB 131. The information to be copied or cut and stored can be from within the document currently being edited with Design Tool 190 or from another Application 170. Information copied or cut from within the document being edited by Design Tool 190 can be copied or cut in two different ways. All of the text and associated text attribute information in the textbox can be cut or copied by placing the textbox in the selected state and clicking Cut Button 221 or Copy Button 222, according to the type of operation desired by the user. In a preferred embodiment, the information stored in connection with this action also includes a description of the structure of the textbox itself, such that the textbox could be reproduced in its entirety from the stored information. Alternatively, part or all of the text contents of a textbox can be cut or copied by placing the textbox in the edit state, performing an inline text selection of all or part of the text in the textbox as discussed above in connection with FIG. 3D, and clicking Cut Button 221 or Copy Button 222 to perform the desired operation.

Figure 4:
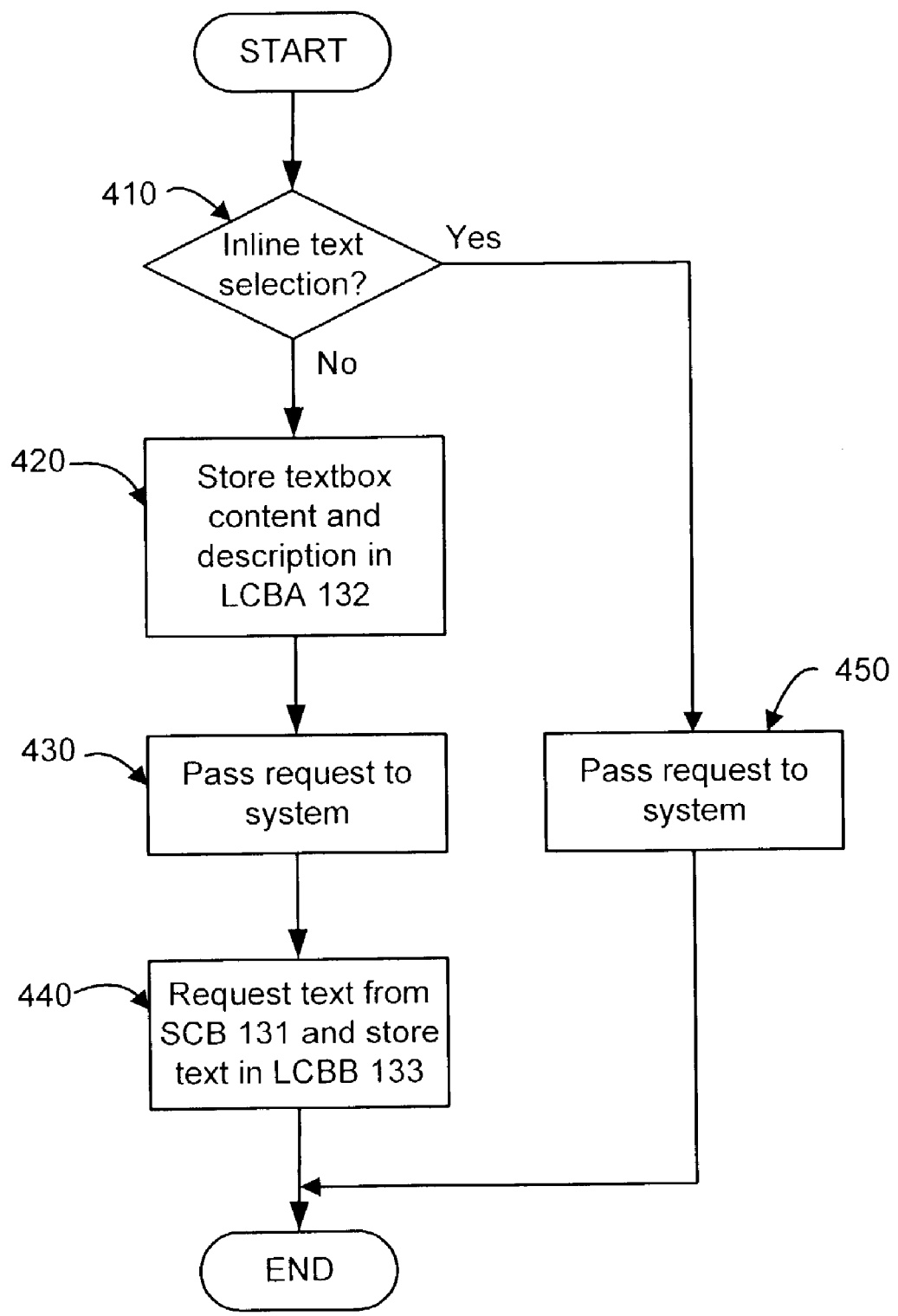
FIG. 4 is a flow chart of the copy and cut procedure.

Referring now to FIG. 4, at step 410, if the cut or copy operation does not involve an inline text selection, the cut or copy command is detected by Design Tool 190 and all content of the textbox, including the text and all text attributes, such as font type, font size, font color, italics, and bolding, are stored in LCBA 132. The command is then passed to Browser 180 at step 430, which causes the content of the textbox to be stored in SCB 131. At step 440, the text of the material just stored by the system, without text attributes, is requested from SCB 131 and stored in LCBB 133. The text-only request is a standard request option for system clipboards supported by major computer operating systems.

At step 410, if the cut or copy operation involves an inline text selection in the textbox, the command is passed to Browser 180, causing the selected portion of the text to be stored in SCB 131. In this inline text selection situation, LCBA 132 and LCBB 133 are not involved and receive no information about the text stored in SCB 131.

Figure 5:
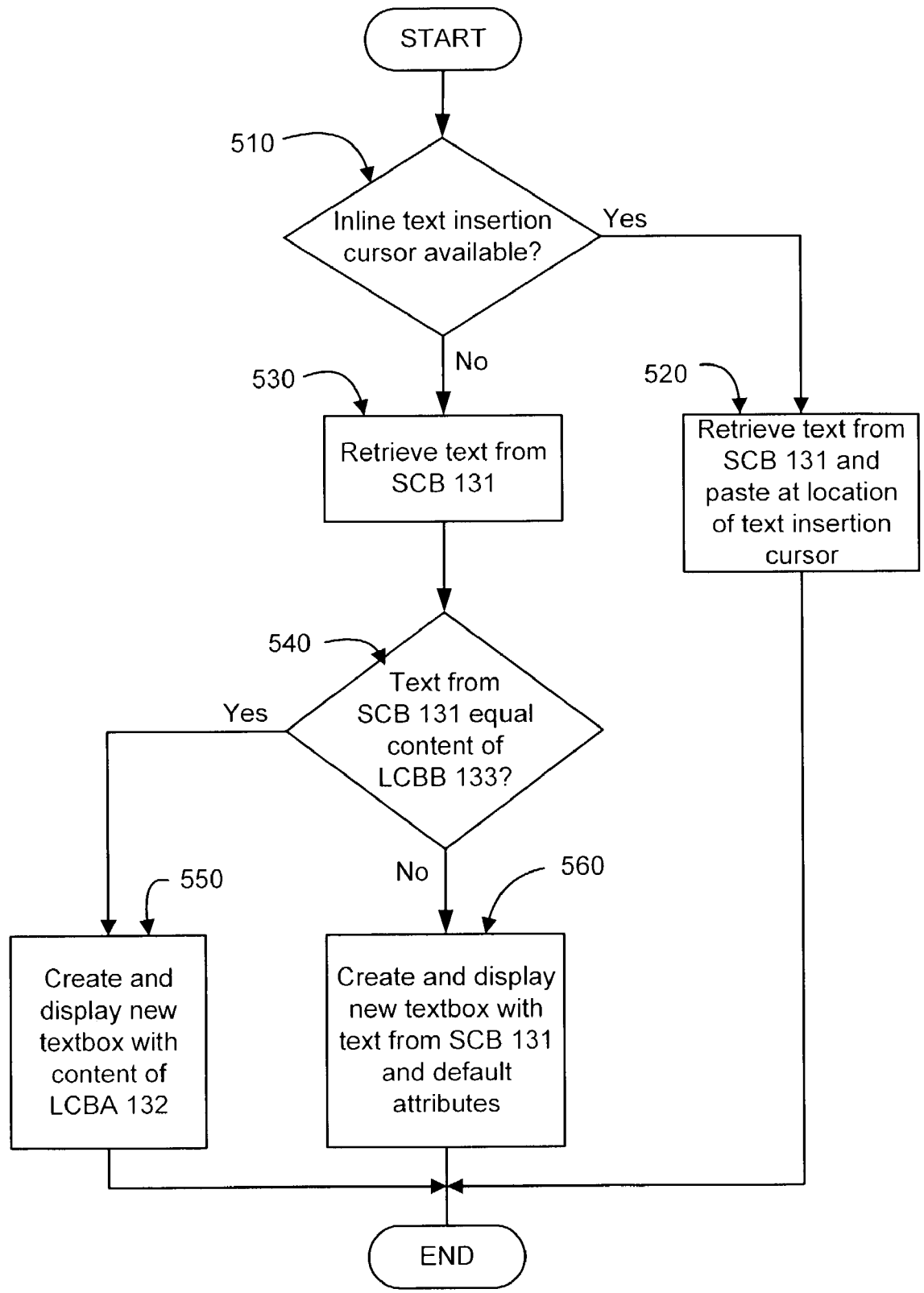
FIG. 5 is a flow chart of the paste procedure.

Referring now to FIG. 5, the paste process that is initiated when the user clicks Paste Button 223 will be discussed. Design Tool 190 is only aware of a copy or cut operation if the text was copied or cut from within the document being edited. Because SCB 131 is available to all applications running on UCS 100, it is possible that the user has placed material in SCB 131 from another application for subsequent pasting into the document. At step 510, if a textbox is in edit mode, the text is requested from SCB 131 and, at step 520, the text is inserted in the selected textbox at the location of the text insertion cursor. In a preferred embodiment, the system assumes that the user desires that the inserted text take on the text attributes of the adjacent text that is already in the selected textbox, therefore, only the text is requested from SCB 131. In a preferred embodiment, the inserted text acquires the attributes of the character immediately preceding the point of text insertion. If the textbox contains no existing text or if the insertion is at the beginning of the text string, the inserted text will take on the default attributes established for that textbox.

If, at the time the paste function is initiated, no textbox is in edit state, a new textbox containing the pasted test will be created and inserted into the document. The particular manner in which this is done depends on the relationship between the contents of LCBB 133 and the contents of SCB 131. To make this determination, at step 530, the text from SCB 131 is retrieved. At step 540, the retrieved text from SCB 131 is compared with the content of LCBB 133. As discussed above, text copied or cut by the user into SCB 131 from an inline selection within a textbox or from a different application is not placed in LCBB 133. Therefore, if the text contents of SCB 131 match the text contents of LCBB 133, this means that the text in the two clipboards represents the text of a textbox that was copied or cut from within the document being edited by Design Tool 190. It also means that all information necessary to duplicate the cut or copied textbox was stored in LCBA 132 at step 420. In this case, the assumption is made that the user desires to have the pasted material appear exactly, including all text attributes, as it did at the source location. A new textbox is created that is identical to the copied or cut textbox. In a preferred embodiment, if the source textbox is on the same page that is currently displayed to the user in Edit Area 210, the new textbox is positioned overlapping and slightly offset from the source textbox. This type of pasting result is depicted in FIG. 2 as dotted line textbox 214, which is a duplicate of source textbox 213. After the pasting operation, the user can then drag the newly created textbox to the desired location elsewhere in the document.

If the source textbox is not currently being displayed in Edit Area 210, for example in the situation where the user cut or copied a textbox from the front side of a two-sided document and now wishes to paste the textbox on the opposite side of the document or where the user desires to paste a textbox on a different page of a multi-page document, the new textbox is inserted at a default location on the page being viewed. The user can then drag the new textbox from the default location to the desired position on the displayed page. In a preferred embodiment, the default location is the upper left corner of the page. This type of pasting is indicated by dotted line textbox 215 in FIG. 2.

If the content of SCB 131 was obtained either from another application or from an inline text selection from a textbox inside of the document being edited, then, at step 540, the content of SCB 131 and LCBB 133 will not be equal. In this situation, a new textbox is created and pasted at the default location, indicated by textbox 215. The text content of the new textbox will be the content of SCB 131. The attributes of the text in the new textbox will be determined by the current settings on Tool Bar 220. The user can then drag the new textbox to the desired location in the document.

While the invention has been shown and described in one preferred embodiment, the described embodiment is to be considered as illustrative rather than restrictive. The scope of the invention is as indicated in the following claims and all equivalent methods and apparatus.

What is claimed is:

1. In a computer system having a system clipboard, a method for performing a store operation in response to a store request from a user engaged in editing a markup language document having one or more textboxes, the method comprising the steps of:
   if any text within a textbox is selected, passing the store request to the system clipboard;
   if a textbox is selected and no text within the textbox is selected, storing the text content and associated text attributes of the selected textbox in a first local clipboard, passing the store request to the system clipboard whereby at least the text of the selected textbox is stored in the system clipboard, requesting the text of the selected textbox from the system clipboard, and storing the text received from the system clipboard in a second local clipboard.

2. In a computer system having a system clipboard, a method for performing a store-and-paste operation in a markup language document having one or more textboxes in response to a store request and a subsequent paste request from a user engaged in editing the document, the method comprising the steps of:
   if any text within a textbox is selected when the store request is detected, passing the store request to the system clipboard;
   if a textbox is selected and no text within the textbox is selected when the store request is detected, storing the text content and associated text attributes of the selected textbox in a first local clipboard, passing the store request to the system clipboard whereby at least the text of the selected textbox is stored in the system clipboard, requesting the text of the selected textbox from the system clipboard, and storing the text received from the system clipboard in a second local clipboard;
   if a text insertion cursor is present in a textbox when the paste request is detected, requesting the text from the system clipboard end inserting the text at the location of the cursor;
   if a text insertion cursor is not present in a textbox when the paste request is detected, creating a new textbox containing the text from the first local clipboard.

3. The method of claim 1 or 2 wherein the store request is a copy request.

4. The method of claim 1 or 2 wherein the store request is a cut request.

5. In a computer system having a system clipboard containing the information most recently stored in the system clipboard, a first local clipboard containing the text and associated text attributes of the textbox most recently stored by the user from a markup language document being edited by the user, and a second local clipboard containing the text of the textbox most recently stored by the user from the document, a method for performing a paste operation in the document in response to a paste request from the user, the method comprising the steps of:
   if a text insertion cursor is present in a textbox, requesting the text from the system clipboard and inserting the text at the location of the cursor;
   if a text insertion cursor is not present in a textbox, requesting the text from the system clipboard and comparing the received text with the contents of the second local clipboard;
      if the received text is not the same as the text in the second local clipboard, creating a new textbox containing the received text;
      if the received text is the same as the text in the second local clipboard, creating a new textbox containing the text from the first local clipboard.

6. The method of claim 5, wherein, if a textbox is created containing the received text, the received text is displayed with default attributes.

7. The method of claim 5 wherein, if a textbox is created containing the received text, the textbox is created at a first default location in the document.

8. The method of claim 2 or 5 wherein, if a textbox is created containing the text from the first local clipboard, the textbox is created at a second default location in the document.

9. The method of claim 2 or 5 wherein, if a textbox is created containing the text from the first local clipboard, the text is displayed with the same attributes as the text had in the source textbox from which the text was copied.

10. A computer-readable medium having embodied therein a document editing program configured to edit a markup language document having one or more textboxes in a computer system having a system clipboard, the program comprising
   program code operative in response to a store request from a user of the computer system to, if any text within a textbox is selected, pass the store request to the system clipboard; and
   program code operative in response to a store request from the user to, if a textbox is selected and no text within the textbox is selected, store the text content and associated text attributes in a first local clipboard, pass the store request to the system clipboard whereby at least the text of the selected textbox is stored in the system clipboard, request the text from the system clipboard, and store the text received from the system clipboard in a second local clipboard.

11. A computer-readable medium having embodied therein a document editing program configured to edit a markup language document having one or more textboxes in a computer system having a system clipboard, the program comprising
   program code operative in response to a store request from a user of the system to, if any text within a textbox is selected, pass the store request to the system clipboard:
   program code operative in response to a store request from the user, if a textbox is selected and no text within the textbox is selected, to store the content and associated text attributes of the selected textbox in a first local clipboard, pass the store request to the system clipboard whereby at least the text of the selected textbox is stored in the system clipboard, request the text of the selected textbox from the system clipboard, and store the text received from the system clipboard in a second local clipboard;

program code operative in response to a paste request from the user to, if a text insertion cursor is present in a textbox, request the text from the system clipboard and insert the received text at the location of the cursor; and program code operative in response to a paste from the user to, if a text insertion cursor is not present in a textbox, create a new textbox containing the text from the first local clipboard.

12. A computer-readable medium having embodied therein a document editing program configured to edit a markup language document having one or more textboxes in a computer system having a system clipboard containing the information most recently stored in the system clipboard, a first local clipboard containing the content and associated text attributes of the textbox most recently stored by the user of the system from a markup language document being edited by the user, and a second local clipboard containing the text of the textbox most recently stored by the user from the document, the program comprising:

program code operative in response to a paste request from the user to, if a text insertion cursor is present in a textbox, request the text from the system clipboard and insert the received text at the location of the cursor;

program code operative in response to the paste request from the user to, if a text insertion cursor is not present in a textbox, request the text from the system clipboard and to compare the received text with the contents of the second local clipboard; and if the received text is not the same as the text in the second local clipboard, to create a new textbox containing the received text;

if the received text is the same as the text in the second local clipboard, to create a new textbox containing the text from the first local clipboard.

13. The program of claim 10, 11 or 12 wherein the program is embodied on a carrier wave.

14. The program of claim 10, 11 or 12 wherein the program is further configured to run in the Web browser of the computer system.

15. The program of claim 11 or 12 wherein the program is further operative to, if a textbox is created containing the text from the first local clipboard, the text is displayed with the same attributes as the text had in the source textbox from which the text was copied.

* * * * *

UNITED STATES PATENT AND TRADEMARK OFFICE
CERTIFICATE OF CORRECTION

PATENT NO. : 6,986,105 B2 Page 1 of 1
APPLICATION NO. : 10/354808
DATED : January 10, 2006
INVENTOR(S) : Kenneth A. Walker, Jr.

It is certified that error appears in the above-identified patent and that said Letters Patent is hereby corrected as shown below:

Title page,

Item [54], title, delete "TEXTBOOK" and replace with -- TEXTBOX--.

Column 3
Line 35, delete "tile" and replace with -- the --.

Signed and Sealed this

Twentieth Day of March, 2007

JON W. DUDAS
*Director of the United States Patent and Trademark Office*